United States Patent [19]
Adams, Jr.

[11] 3,880,507
[45] Apr. 29, 1975

[54] AUDIO VISUAL SYSTEM
[76] Inventor: Francis T. Adams, Jr., c/o Adams Associates, Box 798, Devon, Pa. 19333
[22] Filed: Sept. 28, 1973
[21] Appl. No.: 401,728

Related U.S. Application Data
[63] Continuation-in-part of Ser. No. 146,709, May 25, 1971, abandoned.

[52] U.S. Cl. .................................. 353/17; 353/119
[51] Int. Cl. ..................... G03b 21/30; G03b 31/06
[58] Field of Search ............................ 353/15–19, 353/119, 122

[56] References Cited
UNITED STATES PATENTS
| | | | |
|---|---|---|---|
| 2,070,226 | 2/1937 | Erwood | 353/17 |
| 2,121,910 | 6/1938 | Freiman | 353/17 |
| 2,259,651 | 10/1941 | McClure | 353/17 |
| 3,572,919 | 3/1971 | Hayes | 353/15 |
| 3,614,184 | 10/1971 | Yavata | 312/27 |

Primary Examiner—Richard E. Aegerter
Assistant Examiner—A. V. Mirabito
Attorney, Agent, or Firm—Seidel, Gonda & Goldhammer

[57] ABSTRACT

In an audio visual system a carrying case having a recessed body portion and a recessed lid includes a base platform and a reciprocable projector supporting platform that moves toward and away from the base platform in parallel relation thereto to move the projector from a storage position within the recessed body portion to a functional position above the lip of the body portion. Projector leveling means are provided within the carrying and storage case whereby the projector may be retained upon and moved relative to its supporting platform. A portable projection screen can be stored between the base platform and the projector supporting platform. The carrying case lid is lined with a polymeric material to form a cushion for the projector and audio equipment and also provide an acoustic buffer to prevent vibration of an auxiliary speaker. An auxiliary speaker is releasably mounted within the lid for use at that position or at a remote position. The entire system is shippable without modification.

11 Claims, 20 Drawing Figures

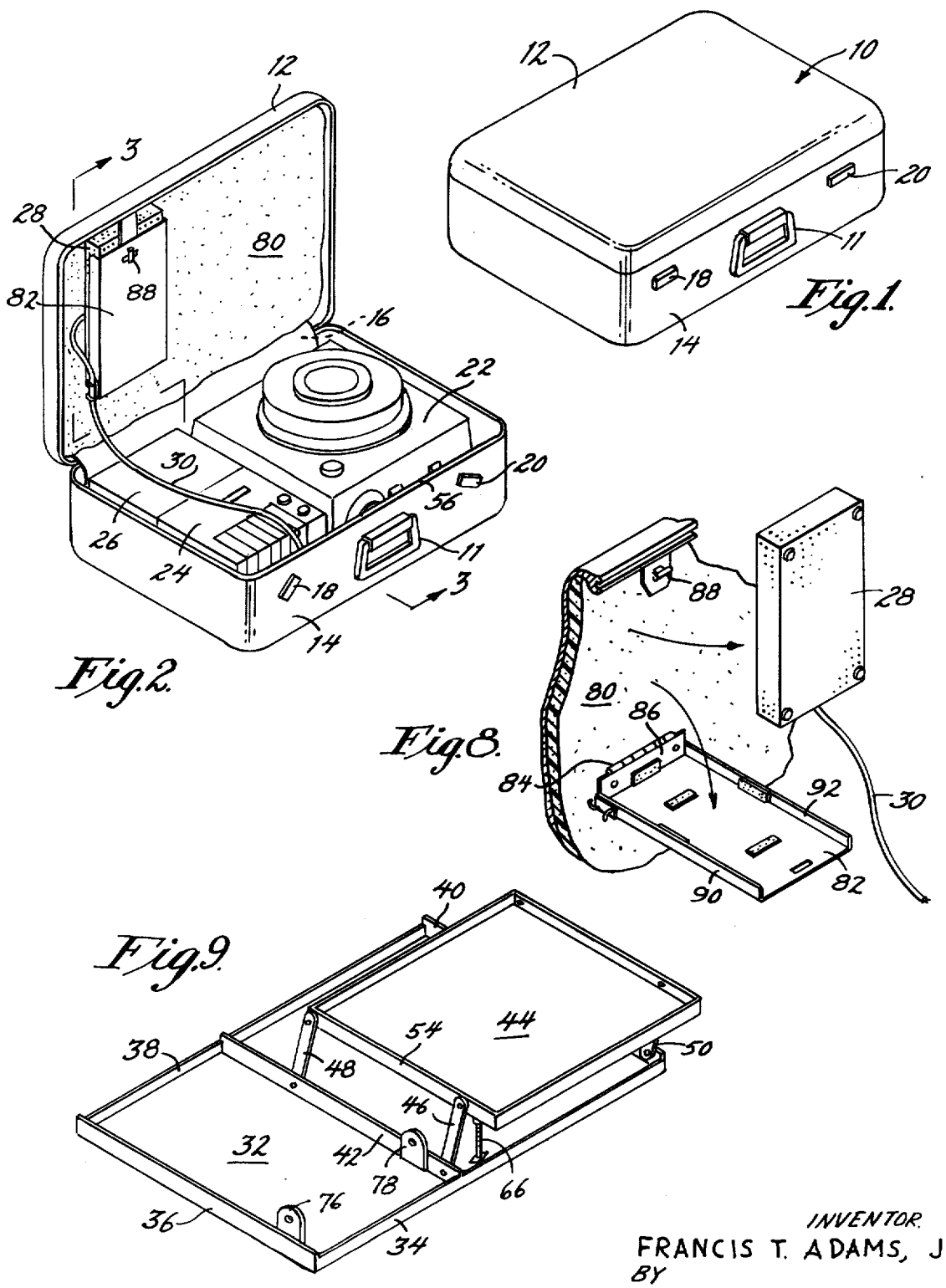

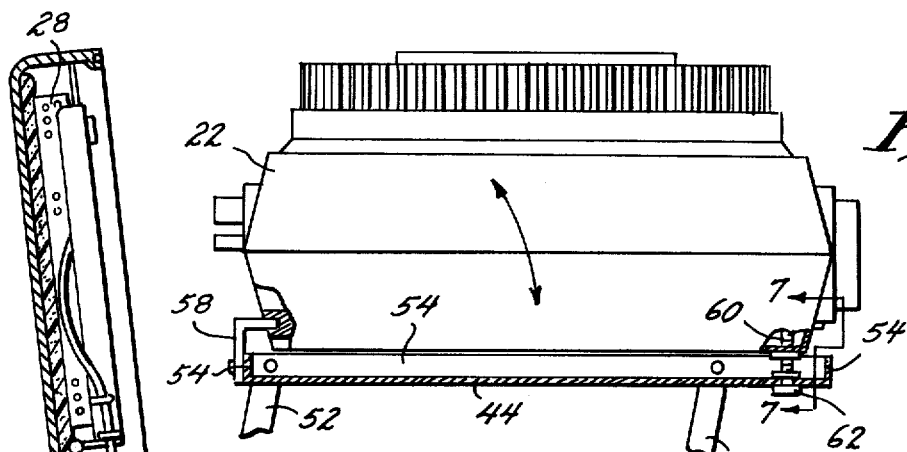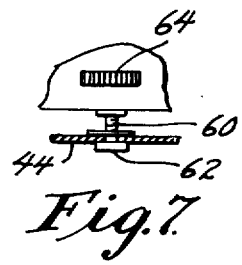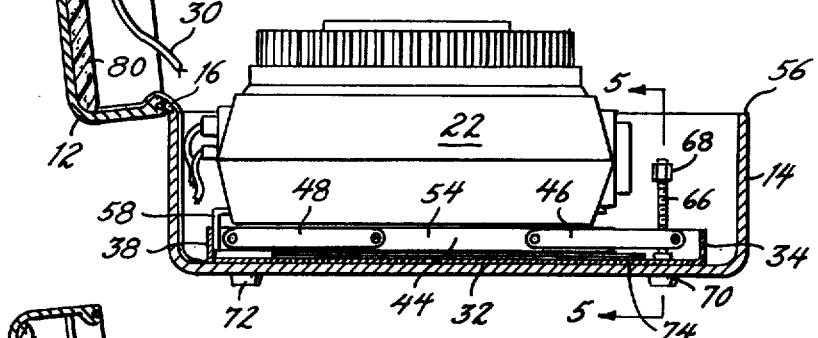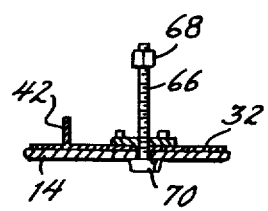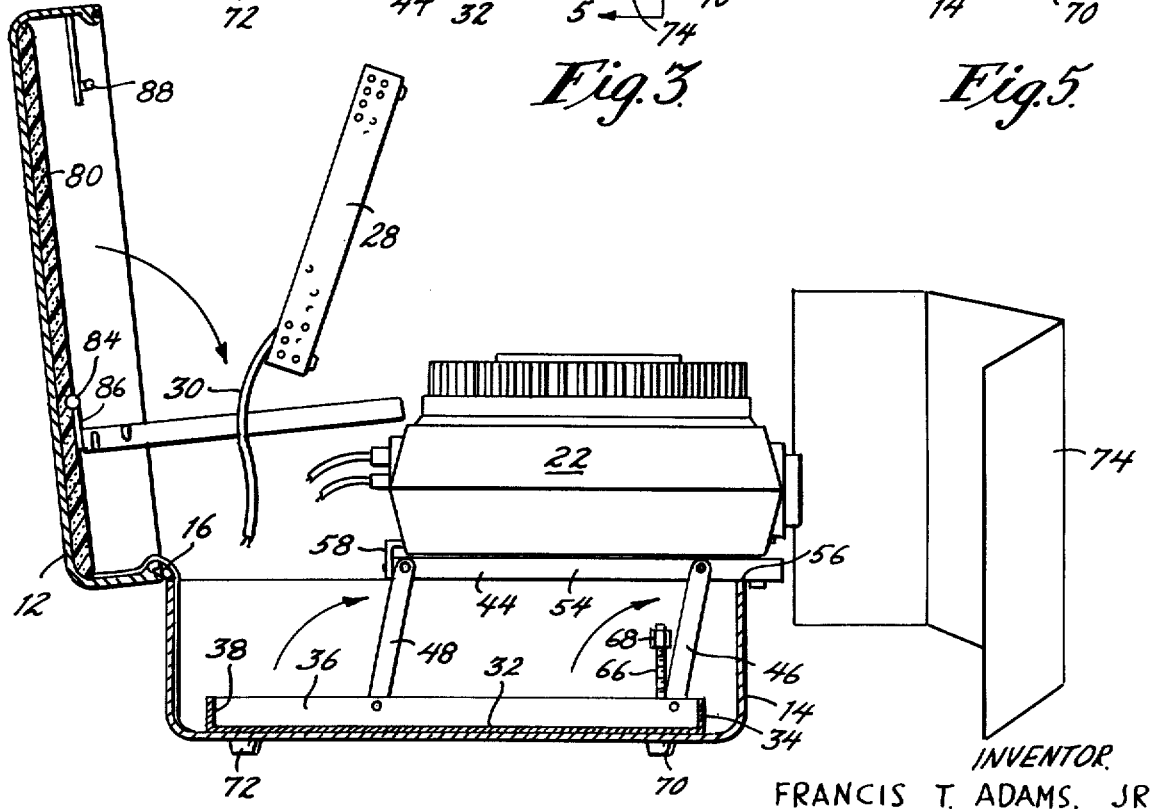

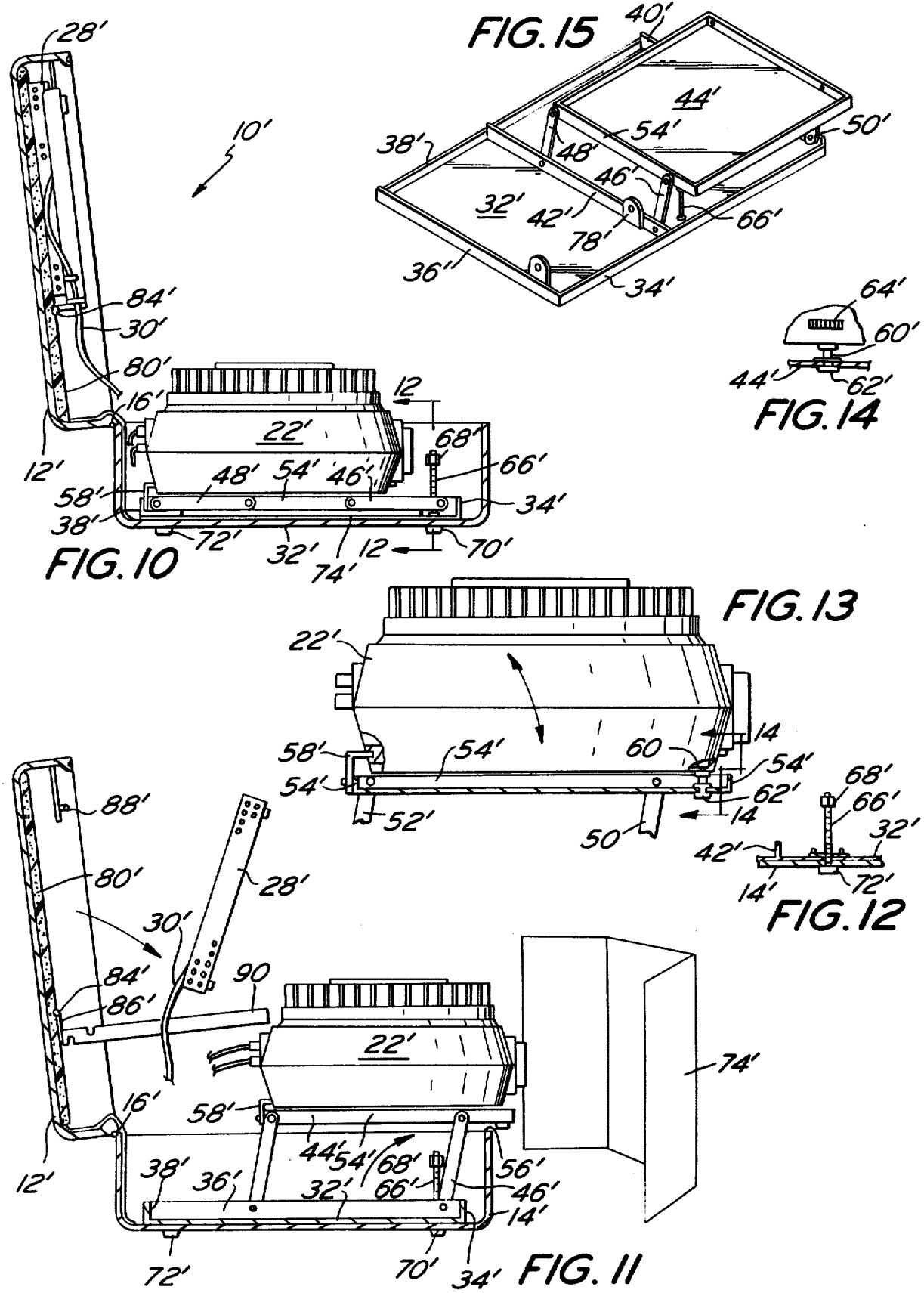

AUDIO VISUAL SYSTEM

This patent application is a continuation-in-part of patent application Ser. No. 146,709, filed May 25, 1971 and now abandoned.

This invention relates to an audio-visual system and in particular to a carrying and storing case for an audio-visual system.

Audio-visual systems consisting of a slide or film strip projector and tape recorder or other means for reproducing sound are well known. Today such systems invariably include means for synchronizing the operation of the slide or film strip projector to the sound. The means most commonly used for effecting synchronism is to have the tape player or the like generate a high frequency, inaudible sound which is detected by the projector and used to initiate a switching mechanism for changing the slide or frame.

Such audio visual systems are often used by salesmen and other persons seeking to make a sight and sound presentation expertly and efficiently. In such situations it detracts from the presentation to have to make an awkward setup of the audio-visual equipment. It would be much more advantageous if the equipment could be so arranged in a convenient carrying and storing case in such a manner that it can be rapidly put to use. It therefore is an object of the present invention to provide such a carrying and storage case.

In accordance with the present invention, the projector, preferably a slide projector, is stored within the carrying case on a projector platform that moves upwardly from a wall of the carrying case to put the projector into operative condition in a single motion. The carrying case is also provided with means to store the sound producing equipment which is preferably a cassette-type tape recorder. Moreover, means for uniquely storing a second or auxiliary speaker for optional use in the case or in a remote location is also provided. Yet another feature of the present invention is a unique use of leveling devices for correct positioning of the projector. Still another unique feature of the present invention is the provision of means for storing a portable projection screen.

Another advantage of the present invention is that it is shippable or transportable through conventional modes of transferring goods, such as by common carrier, without modification. Thus, the carrying case once closed and locked is ready to be shipped via common carrier or the like. The projector and sound equipment are securely held in position and cushioned against shock by the means disclosed hereinafter such that no special preparation is required to ship.

The foregoing and other features of the present invention will be apparent from what is disclosed hereinafter.

For the purpose of illustrating the invention, there is shown in the drawings a form which is presently preferred; it being understood, however, that this invention is not limited to the precise arrangements and instrumentalities shown.

FIG. 1 is a perspective view of a carrying and storage case for an audio-visual system in accordance with one form of the present invention shown in its closed position.

FIG. 2 is a perspective view of the carrying case shown in its open position.

FIG. 3 is a sectional view of the carrying case taken along the line 3—3 in FIG. 2.

FIG. 4 is a sectional view similar to FIG. 3 showing certain of the elements of the audio-visual system in their operative position.

FIG. 5 is a partial sectional view of the apparatus taken along the line 5—5 in FIG. 3.

FIG. 6 is an enlarged side elevation of the carrying case and projector with portions broken away to show the leveling feature.

FIG. 7 is a partial sectional view taken along the line 7—7 in FIG. 6.

FIG. 8 is a perspective view of the speaker and the retention means for securing it in the lid.

FIG. 9 is a perspective view of the projector support platform.

FIGS. 10–15 illustrate a second form of the present invention. The views shown in these Figures correspond to the views shown in FIGS. 3–7 and 9.

Figure 16:
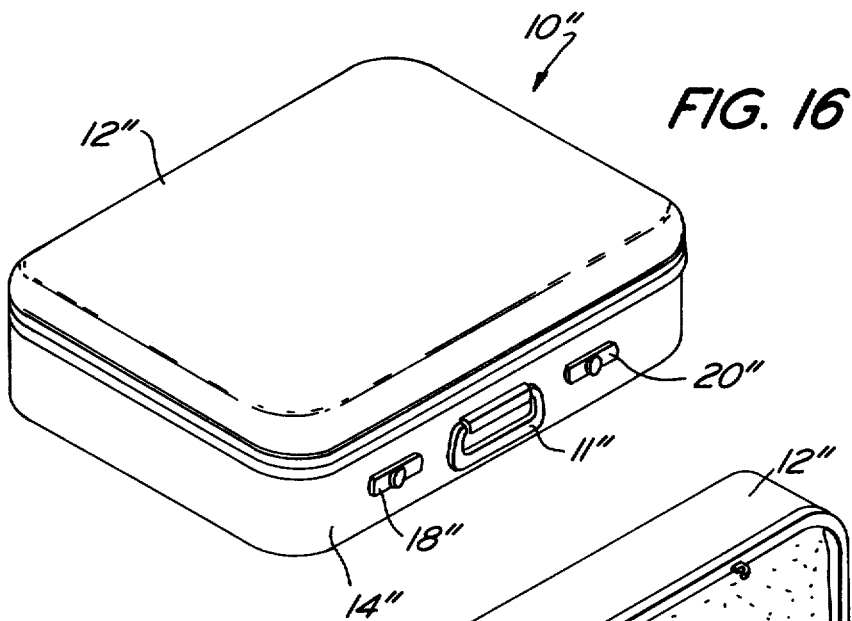
FIG. 16 is a perspective view of a carrying and storage case for an audio-visual system in its closed position in accordance with still another form of the present invention.
Figure 17:
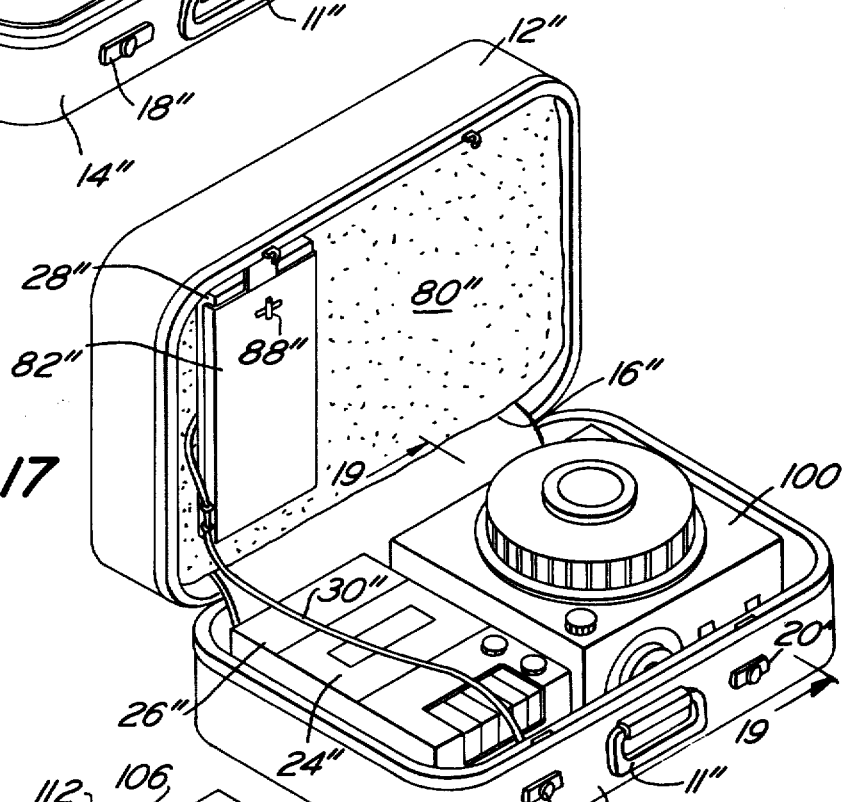
FIG. 17 is a perspective view of a carrying case of FIG. 16 shown in its open position.

Referring now to the drawings in detail, wherein like numerals indicate like elements, there is shown in FIG. 1 a presently preferred form of a carrying case 10 for an audio-visual sound and projection system. The carrying case 10 includes a recessed lid 12 and a recessed body portion 14. The lid 12 is conventionally hinged as by hinge means 16 to the body portion 14 and when closed and locked in position by the latches 18 and 20 defines a chamber for storing and carrying the audio-visual system. A carrying handle 11 is fixed to the body portion 14. The handle is placed so that the case 10 is balanced when it is carried. The carrying case 10 is preferably of the type which includes an aluminum body covered with a plastic material rather than simply molded plastic. A molded plastic case, because of the weight of the equipment, would be likely to split when shipped. The size of the case 10 is such that it can fit under an airplane seat. Therefore, it can be used by a salesman or other person making a business trip without processing it through the luggage handling facilities of an airline.

For the purpose of illustrating the present invention, the audio-visual system includes a slide projector 22 which by way of example may be a Carousel (trademark) Model 850 such as is manufactured and sold by the Eastman Kodak Company of Rochester, New York. Since the projector per se forms no part of the present invention it need not be described in detail. The audio-visual system also includes by way of example a cassette-type recorder and playback mechanism 24 which plays back prerecorded magnetic tape. For the same reason it need not be described in detail. The magnetic tape also includes prerecorded inaudible high frequency signals which are appropriately connected into the slide projector 22 to cause it to sequence from slide to slide in a well known manner. Any cassette or other tape recorder and playback mechanism 24 may be used for this purpose. The recorder and playback mechanism 24 also includes a speaker 26 built into the mechanism through which the audio portion of the system can be broadcast. A second or auxiliary speaker in a housing 28 is connected to the recorder and playback mechanism 24 by a relatively long conductive cable 30. The auxiliary speaker housing 28 is mounted within the lid 12 by a mechanism to be described below. If desired, it can be operated while retained in the lid or it can be removed from the lid and placed at a remote location so as to provide two sources of audio which may be useful when making presentations to larger groups of people.

FIG. 2 illustrates the relative positioning of the projector 22, recorder and playback mechanism 24 and auxiliary speaker 28 within the carrying case 10. The apparatus for retaining the projector 22 and recorder and playback mechanism 24 within the carrying case 10 comprises a base platform 32 best shown in FIG.. 9. Platform 82 is fixed to the bottom wall of the body portion 12 as illustrated in FIGS. 3 and 4. The platform 32 includes four upstanding walls 34, 36, 38 and 40 extending about its periphery and a wall 42 subdividing the base platform 32 into two sections.

The projector 22 is supported on projector platform 44 which is connected to walls 42 and 40 by four elongated, parallel linking arms 46, 48, 50 and 52. Linking arms 46–52 are connected to the walls 40 and 42 as well as to the walls 54 of the projector platform 44 by pins or other means which permit them to pivot relative to such walls or platforms. The equal lengths and parallel relationship between arms 46–52 permits the projector platform 44 to be moved from a position abutting base platform 32 as illustrated in FIG. 3 to the position illustrated in FIGS. 4 and 9. The arms 46–52 maintain the platform 44 parallel to the base platform 32 at all times. The length of the arms is such that in its upper position projector platform 44 rests upon the upper lip 56 of body portion 14. Thus, means are provided for moving the projector 22 from the stored position illustrated in FIG. 3 to the operative position as illustrated in FIG. 4 in a single relatively straight-forward lifting motion. Except for adjusting the projector 22 and positioning of the auxiliary speaker housing 28 as described below, the audio visual system is now ready to be operated.

As best illustrated in FIG. 6, the projector 22 is retained on the projector platform 44 by means of an angle bracket 58 which is bolted to the wall 54 of platform 44 and projects into an opening in projector 22. At the bottom front side of the projector 22, a threaded rod 60 is rotatably fixed at one end to the platform 44 by means of bushings 62 or the like. See FIG. 7. Rod 60 is threadedly engaged in the bottom wall of projector 22. A knurled thumb knob 64 is fixed to rod 60 and partially projects through a side wall of the projector 22. By turning the thumb knob 64, the rod 60 rotates thereby moving the projector upwardly or downwardly relative to the projector platform 44. The nature of the construction illustrated in FIGS. 6 and 7 together with the angle bracket 58 retains the projector on the platform 44. However, the face that the angle bracket 58 merely extends into an opening in the back wall of projector 22 permits the front of the projector to be raised or lowered relative to the platform 44, thereby providing a means to adjust its level for the correct projection angle.

To provide additional leveling and projection angle capabilities, the threaded bolt 66 having a stop nut 68 at its uppermost end is threadedly engaged in the bottom wall of the body portion 14. A resilient pad 70 is fixedly attached to the opposite end of bolt 66. By rotating the pad 70, it is possible to further raise and lower the front end of the carrying case 10 for further adjustment of the projection angle. Additional resilient pads 72 are fixed to the bottom wall of body portion 14.

For a presentation to small groups it may be desirable to use a small readily portable screen. For this purpose the screen 74 is provided. As shown the screen is subdivided along foldlines so that it can be placed in a free standing position in front of the projector 22. The fact that the projector platform 44 moves toward and away from the base platform 32 in parallel relation thereto, provides a unqiue way of storing the screen 74 for transportation without damage thereto. Thus, as illustrated in FIG. 3, the screen 74 is folded and positioned on the base platform 32 with the projector platform 44 resting on it. In this position, the screen is securely held in position and is not flexed or indented or otherwise damaged during transportation of the audio visual system.

The recorder and playback mechanism 24 is retained on the base platform 32 by any conventional means such as the brackets 76 and 78 fixed to the walls 36 and 42 together with an angle bracket (not shown).

As best illustrated in FIGS. 2, 3 and 4, the lid 12 is lined with a foam polymeric material such as foam polyurethane. The lining 80 covers the whole top wall of the lid 12 and serves two purposes. Its first purpose is to provide a shock absorbing cushion for the audio visual equipment making it totally transportable for all purposes. Secondly, it forms as acoustic buffers to prevent vibration when the auxiliary speaker housing is positioned in the lid. The foam polymeric material in combination with the use of an aluminum reinforced carrying case 10 makes the audio visual system wholly shippable via common carrier. Of course, the manner in which all of the equipment is supported within the carrying case protects against it breaking loose or otherwise becoming damaged in shipment.

The auxiliary speaker in housing 28 includes conventional audio transducers (not shown) encased therein. It has perforations uniformly spaced over its entire surface. The speakers within the housing are driven by amplified signals conducted to it over the cable 30 from the recorder and playback mechanism 24. By placing the speaker housing at a remote location ten to twenty feet from the carrying case 10, it is possible to adequately radiate sound to all persons even when the presentation is made to a large group. The fact that the speaker housing is perforated permits sound to radiate from the speakers in all directions, thereby increasing its utility. Of course, sound also radiates from the speaker 26 associated with the recorder and playback mechanism 24, thereby providing two audio sources.

The speaker housing 28 is normally retained in position on the lid 12 by means of a plate 82 connected by the hinge 84 to the lid 12. As shown in FIG. 8, the speaker housing 28 is positioned against the lining 80 so that it rests on the flange 86 projecting from the plate 82. The plate 82 is then rotated into abutment with the planar side of speaker housing 28 to hold it in position between the plate 82 and the liner 80. Plate 82 is latched into position by the twist lock 88 or any equivalent means. The speaker is shown in position against the foam lining 80 in FIG. 2. Dependent flanges 90 and 92 prevent the speaker housing 28 from being displaced laterally when the plate is in abutment with it.

The lining 80 forms an acoustic buffer to prevent vibration of the second speaker such as would be caused if it were held directly against the relatively hard surface of the lid 12.

In FIGS. 10–15 a form of the invention which is similar to that illustrated in FIGS. 1–9 is illustrated. Each of the structural components is identical to that which has been described above in connection with FIGS. 10–15. Thus, corresponding elements have been identified by the identical numerals followed by a prime. Because the structures are identical, there will be no detailed description of the device illustrated in FIGS. 10–15. However, in this form of the invention, the pivot points of the linking arms 46', 48', 50' and 52' comprising the parallelogram linkage are made sufficiently tight fitting so that the friction created thereby is of a high enough degree so that the projector platform 44' can be supported above upper lip 56' (FIG. 11).

In all other respects, the apparatus illustrated in FIGS. 10–15 functions in the same way as that illustrated in FIGS. 1–12.

Now referring to FIGS. 16–20, still another form of the invention is illustrated. Thus, a carrying case 10'' is illustrated in FIG. 16. This carrying case may have substantially the same construction as carrying cases 10 and 10'. However, as will become apparent from what follows it may be somewhat smaller. Thus while cases 10 and 10' may be suitcases, case 10'' may be an attache case. The interior construction of cas 10'' is identical to that which has been disclosed above in connection with carrying cases 10 and 10'. Thus, the components of the carrying case which comprises its interior construction will not be described again. However, they will be identified by the same reference numerals which have been used earlier. Such reference numerals shall be followed by a double prime.

A slide projector 100 that is somewhat smaller than slide projectors 22 and 22' is supported within carrying case 10''. Projector 100 and recorder and play back mechanism 24'' are supported by a retaining means 102 which includes a bottom plate 104 and side rails 106 and 108. The side rails are provided to give rigidity to the support, while the bottom plate 104 provides additional reenforcing for the case.

An intermediate rail 110 divides the retaining means into two compartments. One of the compartments is provided with upwardly extending ears 76'' and 78'' for securing the recording and play back means 24''.

The other portion is provided with a projector support 112.

The projector support includes a hinge which may take the form of an elongated link 114 which is pivoted by pins 116 and 118 to elongated plates 120 and 122. Plate 122 is secured to the bottom plate 104 while plate 120 is connected to the underside of a projector supporting platform 124.

Figure 18:
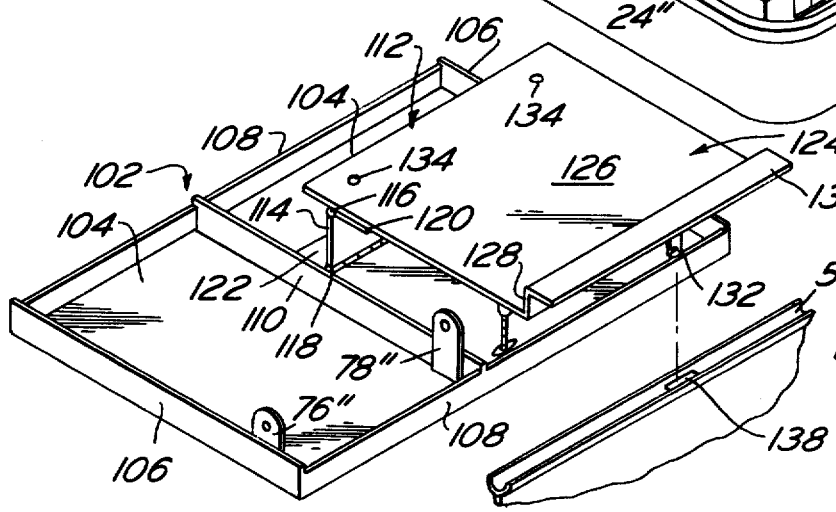
FIG. 18 is an exploded perspective view showing certain of the elements of the audio-visual system illustrated in FIGS. 16 and 17.
Figure 19:
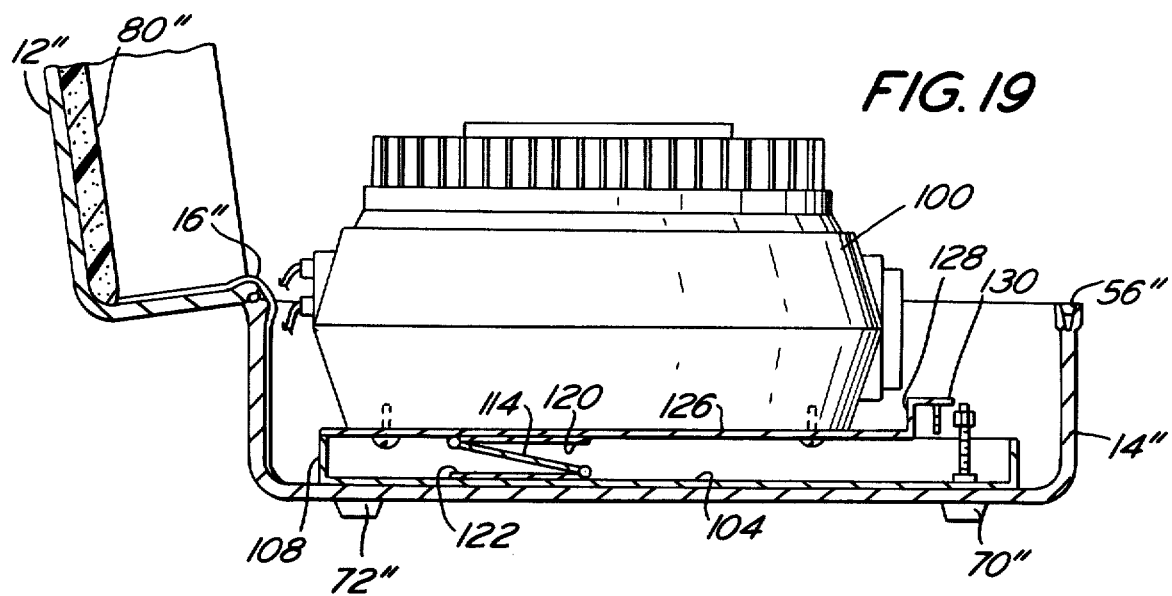
FIG. 19 is a sectional view taken along line 19—19 of FIG. 17.
Figure 20:
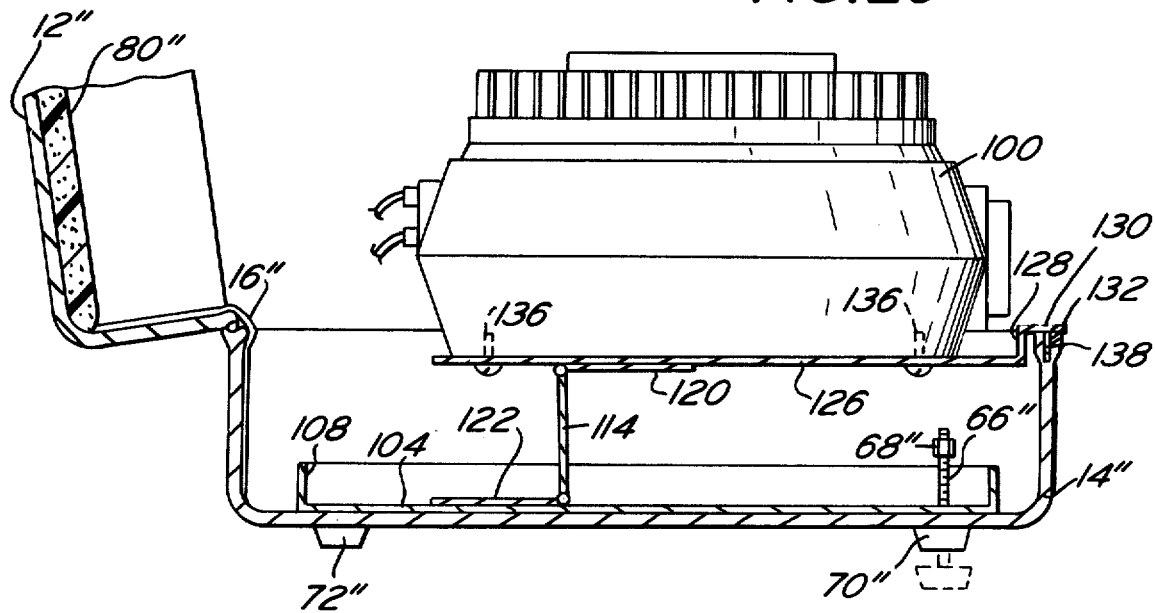
FIG. 20 is a view similar to FIG. 19, but showing the projector in a different position.

As seen in FIGS. 18–20, the projector supporting platform 124 comprises a first major surface 126 which, at its foremost edge has an upwardly directed ledge 128 which supports a forwardly extending horizontally disposed second surface 130. Depending downwardly from surface 130 near its mid portion is a hook-like member 132.

Surface 126 is provided with a plurality of openings 134 through which suitable fastening elements 136 may be extended in order to secure the projector 100 to surface 126. While three such openings are illustrated, it is obvious that more or less openings could be provided depending on the nature of the projector which is to be used.

When the projector is within the case such as illustrated in FIG. 19, platform 124 rests on members 106, 108 and 110. When the case is closed the projector is held securely in this position by the liner of foam material 80'' in a manner identical to that explained above.

In order to use the projector it is merely swung forward from the position illustrated in FIG. 19 to the position illustrated in FIG. 20. Link 114 maintains the projector in a horizontal position when hook member 132 is disposed in opening 138. Opening 138 which is in lip 56'' comprises a part of lock 20. It normally receives the latch which is on lid 12'' when the case is closed. However, it can advantageously be used to engage and retain member 132.

The projector is securely held above the lip 56'' by the link 114, platform 126 and hook-like member 132. To lower the projector the operator merely has to release hook-like member 132. The projector will automatically drop back into the position illustrated in FIG. 19. If desired a small projection screen can be stored below projector platform 126.

The mechanism illustrated in FIGS. 16–20 is particularly suited for projectors which are smaller and which weigh less than the projectors described above with respect to the embodiments illustrated in FIGS. 1–15. Thus, since a smaller projector is used, a smaller carrying case 10 can be used. The results of this is that a smaller and less expensive package is made possible.

Significantly, it should be pointed out with respect to all of the embodiments described above that the carrying cases may be ready-made suitcases, attache cases or the like which are essentially off-the-shelf items. These cases do not have to be modified in any way other than by the inclusion of the retaining means for the recording and play back device and the projector support on the one hand and the liner 80 and auxiliary speaker housing support 82 in the lid.

Thus, a number of important advantages are achieved. One of these advantages is that the cost is substantially reduced because the case need not be modified. Such modification is avoided by virtue of the mechanism for raising the projector above the lip of the case.

Another advantage is the fact that the case can be handled as an ordinary suitcase or an attache case because the handle is positioned so that the case is balanced. Such balancing is accomplished because the lips 56 do not have to be reduced to enable the projector lense to clear them.

Finally, all of the advantages of a suitcase or attache case are accomplished since the projector and play back and recording apparatus can be shipped, handled and generally treated as any ordinary piece of luggage.

From the foregoing, it should be apparent that what has been provided is a compact carrying and storage case for a sound and projection system that is efficient and easy to use.

The present invention may be embodied in other specific forms without departing from the spirit or essential attributes thereof and, accordingly, reference should be made to the appended claims, rather than to the foregoing specification as indicating the scope of the invention.

I claim:

1. A carrying and storage case for a sound and projection system comprising a body portion having opposite wall portions and having an upwardly facing recess, a lid, means for hingedly connecting said lid to said body portion, said lid defining a downwardly facing recess, latch means for securing said lid in a closed position over said body portion with said upwardly and downwardly facing recesses defining a chamber for sound and projection equipment, a carrying handle mounted on said carrying case, a base platform mounted within said body portion, a projector platform overlying said base platform, and means connecting said projector platform to said base platform for moving said projector platform between a position overlying said base platform within said upwardly facing recess and away from said base platform a height sufficient to support a projector lens above the lip of said body portion while maintaining parallel relation to said base portion, means for mounting sound reproducing apparatus to said body portion, said downwardly facing recess in said lid being lined with a foam material for cushioning a sound and projection system mounted within said carrying and storage case, and means on said lid for releasably supporting a housing for an auxiliary speaker, said foam material being disposed between said lid and said last named means to define as acoustic buffer to prevent vibration of an auxiliary speaker, and said means for releasably supporting a housing for an auxiliary speaker comprises a plate, means for hingedly connecting said plate to said lid, at least bottom and side means projecting from said plate to retain the speaker housing in position on said lid, and a latch for holding said plate in overlying relation to said lid so that a speaker housing is retained between said plate and said foam material.

2. A carrying and storage case for a sound projection system comprising a body portion having opposite wall portions and having an upwardly facing recess, a lid, means for hingedly connecting said lid to said body portion, said lid defining a downwardly facing recess, latch means for securing said lid in a closed position over said body portion with said upwardly and downwardly facing recesses defining a chamber for sound and projection equipment, a carrying handle mounted on said carrying case, a base platform mounted within said body portion, a projector platform overlying said base platform, and means connecting said projector platform to said base platform for moving said projector platform between a position overlying said base platform within said upwardly facing recess and away from said base platform a height sufficient to support a projector lens above the lip of said body portion while maintaining parallel relation to said base portion, means for mounting sound reproducing apparatus to said body portion, said downwardly facing recess in said lid being lined with a foam material for cushioning a sound and projection system mounted within said carrying and storage case, and means on said lid for releasably supporting a housing for an auxiliary speaker, said foam material being disposed between said lid and said last named means to define as acoustic buffer to prevent vibration of an auxiliary speaker, and said means for connecting said projector platform to said base platform is a parallelogram linkage which permits said projector platform to overly the upper lip of said body portion, said parallelogram linkage comprising a plurality of arms, each of said arms being pivotally connected to said projector platform and said base platform, the pivotal connection of said arms and said base platform being spaced from one wall portion of said body portion a distance sufficient to enable them to lie substantially along said base platform when said base platform is in said body portion, and being spaced from the opposite wall portion of said body a distance sufficient to enable said projector platform to be supported by said lip thereon when said projector platform is elevated above said base platform.

3. A carrying and storage case for a sound and projection system, comprising:
   a body portion having a bottom wall and upwardly projecting side wall means surrounding the periphery of said bottom wall, said upwardly projecting side wall means including a front wall segment;
   a lid having a top wall and downwardly projecting side wall means surrounding the periphery of said top wall;
   means for pivotally connecting said lid to said body portion;
   latch means for securing said lid in a closed position over said body portion wherein said lid and said body portion define a chamber for sound and projection equipment;
   a carrying handle mounted on said carrying case;
   means for mounting sound reproducing apparatus to said body portion;
   projector platform means for supporting a projector in a first and a second position such that when said projector platform means is in said first position and a projector having a lens is supported thereon, the lens of the projector will be at least partially below the topmost edge of said front wall segment and when said projector platform means is in said second position and a projector having a lens is mounted thereon, the lens of the projector will be completely above the topmost edge of said front wall segment;
   the inner surface of said lid being lined with a cushioning and acoustically buffering foam material;
   support means pivotally connected to said lid for releasably supporting a housing for a speaker, said support means including a plate, side members projecting from said plate, and latch means for holding said plate in overlying relation to said lid wherein the speaker housing can be retained between said lid and said foam material lining the inner surface of said lid.

4. A carrying and storage case for a sound and projection system in accordance with claim 3, wherein said speaker housing has perforations on at least two major sides thereof.

5. A carrying and storage case in accordance with claim 3, wherein said projector platform means includes:
   a base platform connected to said bottom wall of said body portion;
   a projector platform upon which a projector having a lens may be mounted;

a parallelogram linkage comprising a plurality of arms, each of said arms being pivotally connected to said projector platform and said base platform.

6. A carrying and storage case in accordance with claim 5, wherein the arms of said parallelogram linkage lies substantially along said base platform when said projector platform means is in said position, and wherein said projector platform rests upon the uppermost portion of said front wall segment when said projector platform means is in said second position.

7. A carrying and storage case in accordance with claim 5, wherein there is a space defined between said base platform and said projector platform when said projector platform means is in said first position, said space defining a storage space for an auxiliary projection screen.

8. A carrying and storage case for a sound and projection system, comprising:
   a body portion having a bottom wall and upwardly projecting side wall means surrounding the periphery of said bottom wall, said upwardly projecting side wall means including a front wall segment;
   a lid having a top wall and downwardly projecting side wall means surrounding the periphery of said top wall;
   means for pivotally connecting said lid to said body portion;
   latch means for securing said lid in a closed position over said body portion wherein said lid and said body portion define a chamber for sound projection equipment;
   a carrying handle mounted on said carrying case;
   means for mounting sound reproducing apparatus to said body portions;
   projector platform means for supporting a projector in a first and a second position such that when said projector platform means is in said first position and the projector having a lens as supported thereon, the lens of the projector will be at less partially below the topmost edge of said front wall segment and when said projector platform means is in said second position and the projector having a lens is mounted thereon, the lens of the projector will be completely above the topmost edge of said front wall segment, said projector platform means comprising a base platform mounted to said bottom wall of said body portion, a projector platform having a latch member, said latch member adapted to be removably secured to part of said latch means, at least one elongated member, one end of said elongated member being pivotally connected to said base platform and a second end of said elongated member being pivotally connected to said projector platform, said elongated member and said latch member being of sufficient size such that when said latch member is secured to part of said latch means, said projector platform means is in said second position and when said latch member is not secured to part of said latch means, said projector platform means may be moved into said second position;
   the inner surface of said lid being lined with a cushioning and acoustically buffering foam material;
   support means pivotally connected to said lid for releasably supporting a housing for a speaker.

9. A carrying and storage case in accordance with claim 8, wherein said support means includes a plate, side members projecting from said plate, and latch means for holding said plate in overlying relation to said lid wherein the speaker housing can be retained between said lid and said foam material lining the inner surfaces of said lid.

10. A storage and carrying case in accordance with claim 8, wherein there is a space defined between said base platform and said projector platform when said projector platform means is in said first position, said space defining storage space for an auxiliary projection screen.

11. A carrying and storage case in accordance with claim 8, wherein said speaker housing has perforations on at least two major sides thereof.

* * * * *